United States Patent Office 2,872,898
Patented Feb. 10, 1959

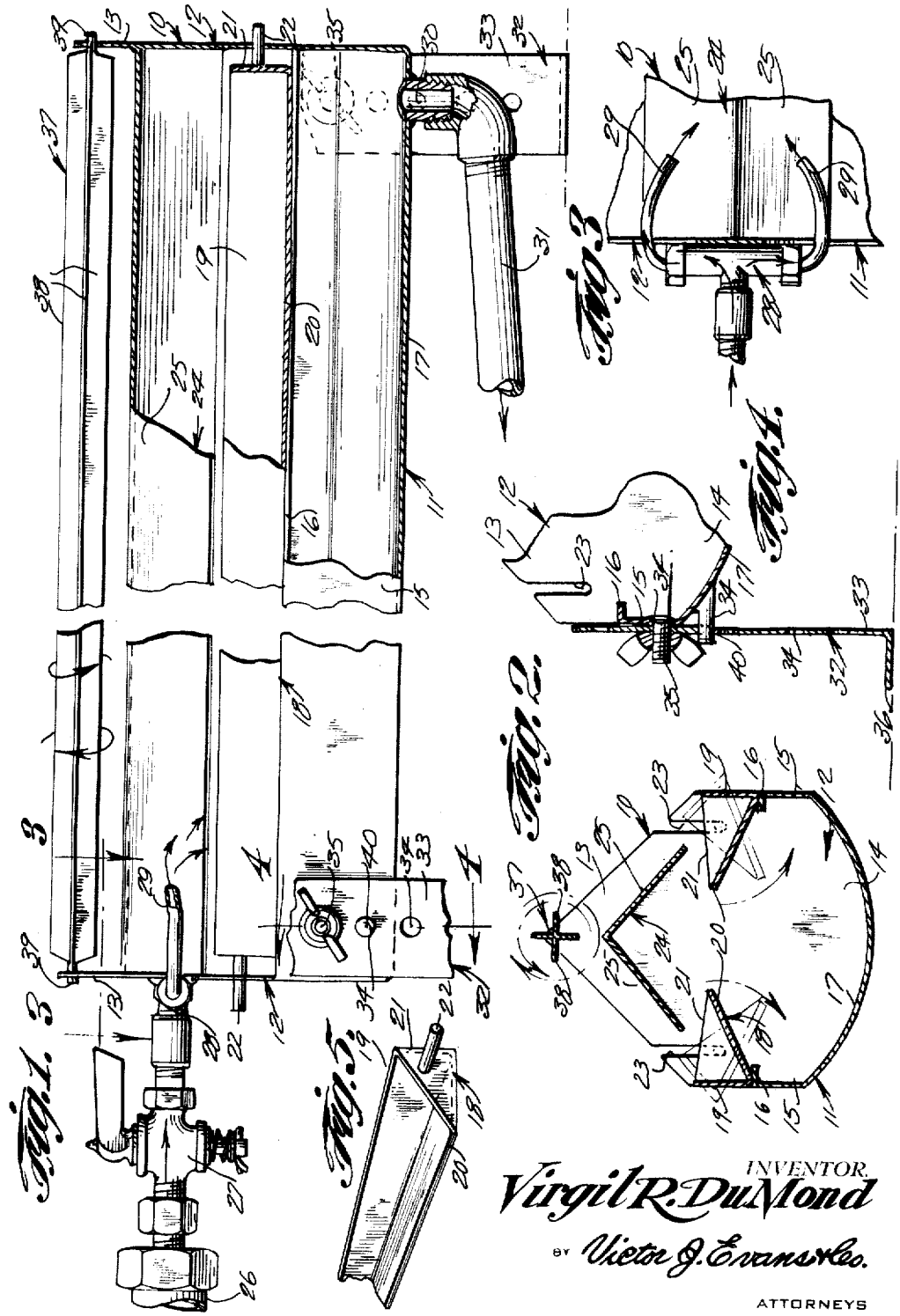

2,872,898
POULTRY DRINKING FOUNTAIN

Virgil R. Du Mond, Nixon, Tex.

Application June 13, 1957, Serial No. 665,552

7 Claims. (Cl. 119—74)

This invention relates to a poultry drinking fountain.

The object of the invention is to provide a drinking fountain which is constructed so that poultry will be able to readily have available a suitable quantity of fresh clean drinking water.

Another object of the invention is to provide a poultry drinking fountain which is constructed so that it includes a pair of tiltable or movable trays so that after a predetermined quantity of water enters the trays, the trays will automatically tilt whereby the trays will be kept in a clean condition so that the poultry will be able to drink water which is fresh and clean at all times.

Another object of the invention is to provide a poultry drinking fountain which is constructed so that the poultry will be unable to roost or perch thereon, and wherein at predetermined intervals after a desired quantity of water has entered the drinking trays, the trays will automatically tilt or move so that dirty water in the trays will be automatically emptied whereby a fresh supply of drinking water can be permitted to run into the trays, and wherein the water is kept at the proper level without requiring the use of float valves or the like which have a tendency to get out of order or become stuck.

A further object of the invention is to provide a poultry drinking fountain which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary side elevational view showing the poultry drinking fountain of the present invention, and with parts broken away and in section.

Figure 2 is a transverse vertical sectional view taken through the poultry drinking fountain of the present invention.

Figure 3 is a sectional view taken on the line 3—3 of Figure 1.

Figure 4 is a sectional view taken on the line 4—4 of Figure 1.

Figure 5 is a fragmentary perspective view illustrating one of the movable trays.

Referring in detail to the drawings, the numeral 10 indicates the poultry drinking fountain of the present invention, and the drinking fountain includes a base which is indicated generally by the numeral 11. The base 11 includes a pair of spaced parallel vertically disposed end walls 12, and each of the end walls 12 includes an upper pointed portion 13 and a lower portion 14 provided with a lower arcuate or curved edge as for example as shown in Fig. 2.

Extending between the pair of end walls 12 and secured thereto in any suitable manner, as for example by welding, is a pair of spaced parallel vertically disposed side walls 15, and extending inwardly from the upper edge of each of the side walls 15 is a horizontally disposed flange 16. A bottom wall 17 of curved formation extends between the lower portions of the pair of end walls 12 and is secured thereto, and the bottom wall 17 extends between the pair of side walls 15 and is secured thereto or formed integral therewith.

The poultry drinking fountain of the present invention further includes a pair of trays which are each indicated by the numeral 18, and the trays 18 are rotatably or tiltably supported between the end walls 12.

A perspective view illustrating one of the trays 18 is shown in Fig. 5, and it will be seen that each tray 18 includes a pair of triangular shaped end sections 21 and a back section 19 and there is further provided a bottom section 20 which is arranged angularly with respect to the back section 19. Trunnions or pins 22 extend outwardly from the end sections 21, and the pins 22 are arranged in engagement with slots 23 which are formed in the end walls 12.

There is further provided a V-shaped body member which is indicated generally by the numeral 24, and the body member 24 includes a pair of angularly arranged flat portions 25, Fig. 2. The body member 24 extends between the pair of end walls 12 and is secured thereto in any suitable manner.

There is further provided a means for supplying fluid such as water to the poultry drinking fountain, and this means comprises a conduit 26 which is adapted to be connected to a suitable source of supply of water, and a valve 27 is connected to the conduit 26, Fig. 1. A fitting or bushing 28 is arranged adjacent the valve 27 and connected thereto, and a pair of spaced apart nozzles or tubes 29 extend from the fitting 28. The tubes 29 are adapted to have water pass therethrough, Fig. 3, and the free ends of the tubes 29 terminate at a point adjacent the flat portions 25 of the body member 24 so that the water issuing from the tubes 29 will cascade down the inclined portions 25 and into the trays 18. Normally the trays 18 are in the position shown in Fig. 2, but when a sufficient weight or quantity of water is received in the trays 18, from the tubes 29, the trays 18 will automatically tilt or pivot about an axis extending through the pins 22 so that the water in the trays will dump from the trays out into the base 11. Thus, the trays 18 are self cleaning whereby a ready supply of fresh clean water is always available for the poultry to drink. As shown in Fig. 1, a suitable outlet 30 is connected to the base 11, whereby the excess water or dirty water can readily flow therethrough into a pipe or conduit 31 which can lead to any suitable or desired location.

There is further provided a leg supporting means for the poultry drinking fountain, and this supporting means comprises a plurality of legs which each have an L-shape, and wherein each of the legs is indicated generally by the numeral 32, Fig. 4. Each leg 32 includes a vertical portion 33 which is provided with a plurality of spaced apart openings 34 whereby a suitable securing element such as the bolt and nut assembly 35 can be extended through certain of these openings and into engagement with the base 11 for maintaining the legs connected to the fountain. Each leg 32 further includes a lower horizontal portion 36 which helps stabilize the structure.

An anti-roosting means is provided for helping to prevent the poultry from perching or roosting on the fountain, and this means comprises a rotary support member which is indicated generally by the numeral 37. The member 37 includes a plurality of angularly arranged longitudinally extending ribs 38, and pins or trunnions 39 extend from the ends of the member 37 and are journaled in the end walls 12. Thus, in the event that any of the poultry attempt to perch on the member 37, the member 37 will rotate about an axis extending through the pins 39 so that the poultry will not be able to roost or perch thereon; and this will help to maintain the drinking fountain in a clean or sanitary condition. Lugs or pins 40 extend from the bottom wall 17 and project through certain of the openings 34 in the legs 32 so as to help steady the legs, Fig. 4.

From the foregoing, it is apparent that there has been provided a poultry drinking fountain which is constructed so that poultry will have a ready and convenient source of clean drinking water. In use, the conduit 26 is adapted to be connected to a suitable source of supply of water, and then with the valve 27 opened, the water will flow from the conduit 26 through the valve 27 and into the fitting 28. Some of this water will pass out through the nozzles or tubes 29, and it is to be noted that there are two of the tubes 29. The water from the tubes 29 is sprayed or discharged along the upper surfaces of the flat portions 25 of the body member 24 so that this water will continually run down along the surfaces 25 and enter the trays 18. Normally, the trays 18 are in the solid line position shown in Fig. 2 and the trays 18 are supported in this position by means of the pins 22 which extend through the slots or cutouts 23 in the end walls 12. However, when sufficient water is received in the trays 18, the weight of the water will cause the trays 18 to tilt or rotate about an axis extending through the pins 22 whereby the water in the trays will be dumped onto the bottom wall 17 of the base 11, and this water will then flow out through the discharge port 30 and then through the pipe 31 to any suitable location. After the water has been dumped from the trays 18, and as fresh water is discharged into the trays 18, the trays 18 will return to the upright positions shown in Fig. 2 so that the poultry can drink the water from the trays. Thus, it will be seen that the construction of the poultry drinking fountain is such that the trays 18 periodically empty whereby dirty water in the trays is dumped out so that fresh water is always available for use by the poultry.

The member 37 is rotatably supported by means of the trunnions or pins 39 so that in the event that any of the poultry attempt to perch or roost on the member 37, the member 37 will rotate which will make it difficult for the poultry to roost thereon and this will also help to maintain the drinking fountain in a clean and sanitary condition. The legs 32 can be adjusted, and the bolt 35 and pin 40 are adapted to extend through certain of the openings 34 in the legs 32 so as to maintain the parts immobile in their adjusted positions.

The parts can be made of any suitable material, and in different shapes or sizes. The drinking fountain can be connected to a large hose or the like, and the drinking fountain of the present invention is constructed so that a supply of water is maintained clean and wherein it is not necessary to use floats or the like and this is advantageous since such floats have a tendency to become clogged and wherein they often fail to function properly. Thus, the poultry will have a continuous supply of fresh water. The body member or shield 24 has the V-shape so that the water will cascade down into the tiltable trays. If desired, the size or shape of the parts can be varied so as to permit use of the device by pets such as dogs, cats or the like or wherein the device can be used by other animals.

Furthermore, if desired, a suitable stopper can be arranged in engagement with the opening or conduit 30 and wherein the base can then be provided with a quantity of fluid having a suitable medicine therein so that such fluid can be used for treating diseased poultry in any desired manner.

While I have shown a preferred form of my invention, I reserve all rights to such modifications as properly fall within the scope of the invention as claimed.

I claim:

1. In a poultry drinking fountain, a base, a plurality of trays tiltably supported by said base, and means for supplying a quantity of fluid to said trays, whereby when a predetermined quantity of fluid is received in the trays, the trays will tilt and dump the contents therefrom into the base, said base including a bottom wall and spaced parallel vertically disposed end walls, and an inverted V-shaped body member extending between said end walls and secured thereto, said trays positioned below said body member, and an anti-roosting member rotatably supported by the upper portions of said end walls, the means for supplying said fluid to said trays comprising a water supply line mounted in one of said end walls and extended over said V-shaped body member.

2. In a poultry drinking fountain, a base including a pair of spaced parallel vertically disposed end walls, each of said walls including a lower arcuate portion and an upper pointed portion, a pair of spaced parallel vertically disposed side walls extending between said end walls and secured thereto, a horizontally disposed flange extending inwardly from the upper edge of each of said side walls, a bottom wall of curved formation extending between the lower portions of said end walls and secured thereto, there being a pair of spaced parallel vertically disposed slots in each of said end walls, an inverted V-shaped body member extending between said pair of end walls and secured thereto, said body member including a pair of angularly arranged flat portions, a pair of trays tiltably supported between said end walls, said trays being positioned so that said body member extends over said trays, and pins extending from the ends of said trays and projecting into said slots.

3. The structure as defined in claim 2, wherein each of said trays includes a triangular end section, back sections extending between said end sections and secured thereto, and a bottom section arranged angularly with respect to said back section and secured to said end sections.

4. The structure as defined in claim 2, and further including a plurality of L-shaped legs adjustably connected to said base.

5. The structure as defined in claim 2, and further including a support member rotatably supported by the upper portions of said end walls.

6. The structure as defined in claim 2, and further including means for supplying fluid to said trays.

7. In a poultry drinking fountain, a base including a pair of spaced parallel vertically disposed end walls, each of said walls including a lower arcuate portion and an upper pointed portion, a pair of spaced parallel vertically disposed side walls extending between said end walls and secured thereto, a horizontally disposed flange extending inwardly from the upper edge of each of said side walls, a bottom wall of curved formation extending between the lower portions of said end walls and secured thereto, there being a pair of spaced parallel vertically disposed slots in each of said end walls, an inverted V-shaped body member extending between said pair of end walls and secured thereto, said body member including a pair of angularly arranged flat portions, a pair of trays tiltably supported between said end walls, said trays being positioned so that said body member extends over said trays, and pins extending from the ends of said trays and projecting into said slots, each of said trays including triangular end sections, a back section extending between said end sections and secured thereto, and a bottom section arranged angular with respect to said back section and secured to said end sections, a plurality of L-shaped legs adjustably connected to said base, a support member rotatably supported by the upper portions of said end walls, and means for supplying fluid to said trays, said last named means comprising a conduit adapted to be connected to a source of supply of fluid, a valve connected to said conduit, a fitting arranged contiguous to said valve, a pair of spaced apart tubes extending from said fitting and terminating at a point adjacent the angularly arranged flat portions of the body member, and conduit means connected to the bottom wall of said base for conveying fluid away from said base.

References Cited in the file of this patent

UNITED STATES PATENTS

| | | |
|---|---|---|
| 1,368,553 | Frost | Feb. 15, 1921 |
| 1,854,117 | Devitt | Apr. 12, 1932 |
| 2,165,753 | Hobbs | July 11, 1939 |